United States Patent [19]
Nayler

[11] Patent Number: 6,154,724
[45] Date of Patent: Nov. 28, 2000

[54] ENERGY BASED PULSE POSITION DETECTOR FOR TELEPHONE WIRE NETWORKS

[75] Inventor: Colin D. Nayler, Sunnyvale, Calif.

[73] Assignee: Advanced Micro Devices, Inc., Sunnyvale, Calif.

[21] Appl. No.: 09/102,090

[22] Filed: Jun. 23, 1998

[51] Int. Cl.[7] .................................................. H04M 1/00
[52] U.S. Cl. ............................................ 704/350; 704/399
[58] Field of Search ..................................... 379/350, 252, 379/93.08, 39, 45, 90.01, 93.05, 399

[56] References Cited

U.S. PATENT DOCUMENTS

| | | | |
|---|---|---|---|
| 3,573,727 | 4/1971 | Freeny | 371/6 |
| 4,097,690 | 6/1978 | Kuntz et al. | 379/39 |
| 4,645,881 | 2/1987 | LeToumelin et al. | 379/252 |
| 5,673,304 | 9/1997 | Connor et al. | 379/45 |
| 5,930,340 | 7/1999 | Bell | 379/93.08 |
| 5,977,822 | 11/1999 | Rybicki et al. | 329/313 |
| 6,011,579 | 1/2000 | Newlin | 348/15 |

*Primary Examiner*—Richemond Dorvil

[57] ABSTRACT

A system for detecting a pulse position is provided in a telephone wire network. An absolute value detector determines the absolute value of a received pulse signal supplied from a telephone wire, and produces a waveform envelope. A low-pass filter filters out high frequency components of the envelope. An integrator performs the time integration of the filtered envelope to produce an integrated waveform representing the energy of the received pulse signal. A slicing circuit determines when the integrated waveform crosses threshold level to detect the time position corresponding to the arrival time of the received pulse signal. The arrival time position is translated into a digital value representing data received form the telephone wire.

20 Claims, 5 Drawing Sheets

ENERGY BASED PULSE POSITION DETECTOR FOR TELEPHONE WIRE NETWORKS

FIELD OF THE INVENTION

This application relates to data communications, and more specifically, to pulse position detectors for telephone wire networks.

BACKGROUND ART

In recent years there has been a huge increase in the demand for cost-effective communications networks. One of such networks is a telephone wire network that uses telephone line wiring existing in a building, such as Plain Old Telephone Service (POTS) line wiring, as a medium for the data transmission between computers.

In telephone wire networks, the arrival position in time of a received band limited pulse may be used to convey digital information. The waveform of a received band limited pulse is illustrated in FIG. 1. Conventionally, the arrival position of a received pulse is detected using a waveform envelope representing the absolute value of the received signal (FIG. 2). The envelope is supplied to a slicing circuit having a threshold level selected to identify the arrival position of the received pulse. When the envelope crosses the threshold level, the slicing circuit detects the arrival position of the pulse.

However, in telephone wire networks, a received envelope waveform depends largely on the wiring topology. As the wiring topology may cause multiple signal reflections, the shape of a received pulse may be so distorted that the envelope will have multiple localized maximum points. In addition, the wiring topology varies from place to place. Therefore, the distortion of the received pulse is unpredictable.

FIG. 3 illustrates the waveform of a received pulse signal having multiple localized maximum points due to wiring topology. FIG. 4 illustrates the waveform envelope of such a pulse signal. In response to the waveform envelope having multiple maximum points, a slicing circuit may identify multiple pulse positions, at which the envelope crosses a threshold level. As a result, a unique time value for the arrival position of a received pulse cannot be detected. This can cause data recovery errors.

Thus, it would be desirable to provide a pulse position detector capable of identifying a unique pulse arrival position even if the received pulse is highly distorted.

DISCLOSURE OF THE INVENTION

Accordingly, the advantage of the present invention is in providing a pulse position detector capable of identifying a unique arrival position of a receive pulse, even if the pulse is highly distorted.

This and other advantages of the present invention are achieved at least in part by providing a pulse position detector that comprises an input circuit for receiving an incoming pulse signal. For example, the incoming pulse signal may be supplied from Plain Old Telephone Service line wiring in a building. An integrator performs the integration over time of a receive signal supplied from the input circuit to produce an integrated signal representing energy of the incoming pulse signal. A slicing circuit provides pulse position indication when the integrated signal reaches a threshold level.

In accordance with a preferred embodiment of the invention, the input circuit may comprise an absolute value detector for producing an envelope representing the absolute value of received pulse signal amplitude. A filter may be provided for filtering out high frequency components of the envelope. The integrator performs integration of the filtered envelope supplied from the filter. The slicing circuit may comprise a comparator for producing a pulse position indication signal when the integrated signal reaches the threshold level.

A control circuit may determine levels of receive signals supplied from the input circuit to establish the threshold level in the slicing circuit. The control circuit may reset the integrator when the integrated signal reaches the threshold level.

Further, the control circuit may be coupled to the input circuit to determine a noise level in the absence of an information signal. A noise level signal representing the noise level may be supplied to the integrator to prevent it from performing the integration of the receive signal until the receive signal exceeds the noise level.

When the integrated signal reaches the threshold level, the control circuit may be supplied with the pulse position indication signal from the slicing circuit to produce a bit pattern identifying the position in time of the incoming pulse signal. This bit pattern corresponding to data represented by the incoming pulse signal may be transferred to a data network.

In accordance with another aspect of the invention, a telephone wire network for providing data communications over telephone line wiring in a building may comprise a pulse position detector that detects the position in time of a pulse supplied from the telephone line wiring. A media access controller transfers a digital value representing the time position to a data network that delivers incoming data to an addressee. The pulse position detector in the telephone wire network may include an input circuit coupled to the telephone line wiring, an integrator for performing integration in time of a receive signal supplied from the input circuit to produce an integrated signal representing energy of the incoming pulse, a slicing circuit for producing a time indication signal when the integrated signal reaches a preset threshold level, and an output circuit responsive to the time indication signal for producing the digital value transferred to the media access controller.

In accordance with a method of the present invention the following steps are carried out for detecting position in time of an incoming pulse supplied from telephone line wiring:

producing an envelope representing the absolute value of incoming pulse amplitude, integrating the envelope over time to produce an integrated signal proportional to energy of the incoming pulse, and detecting a moment when the integrated signal reaches a preset threshold level to indicate a position in time corresponding to arrival of the incoming pulse.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING-OUT THE INVENTION

Although the invention has general applicability in the field of data processing, the best mode for practicing the invention is based in part on the realization of a pulse position detector in a telephone wire network that uses telephone wiring, such as Plain Old Telephone Service (POTS) line wiring existing in a building, as a medium for the data transmission between computers.

Figure 1:
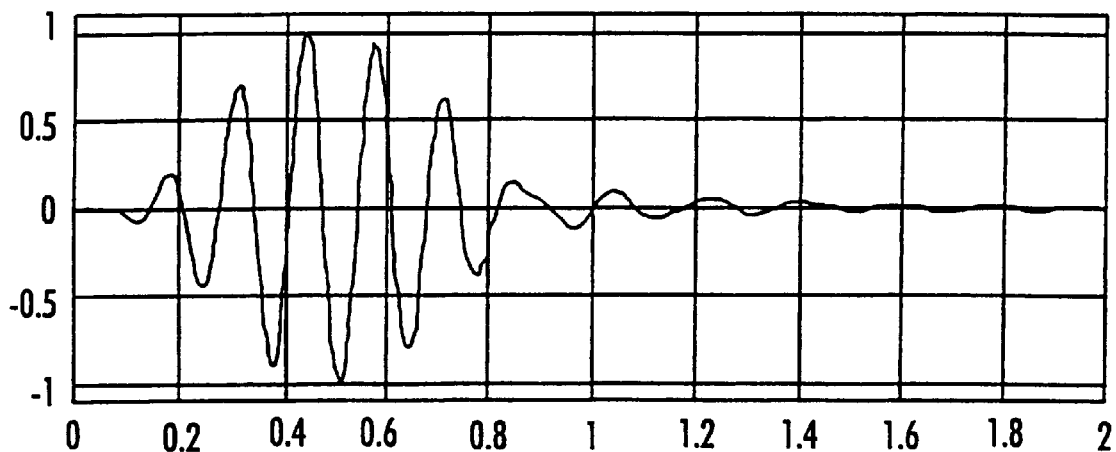
FIG. 1 is a waveform illustrated a band limited pulse the arrival time position of which may be used to convey digital information.
Figure 2:
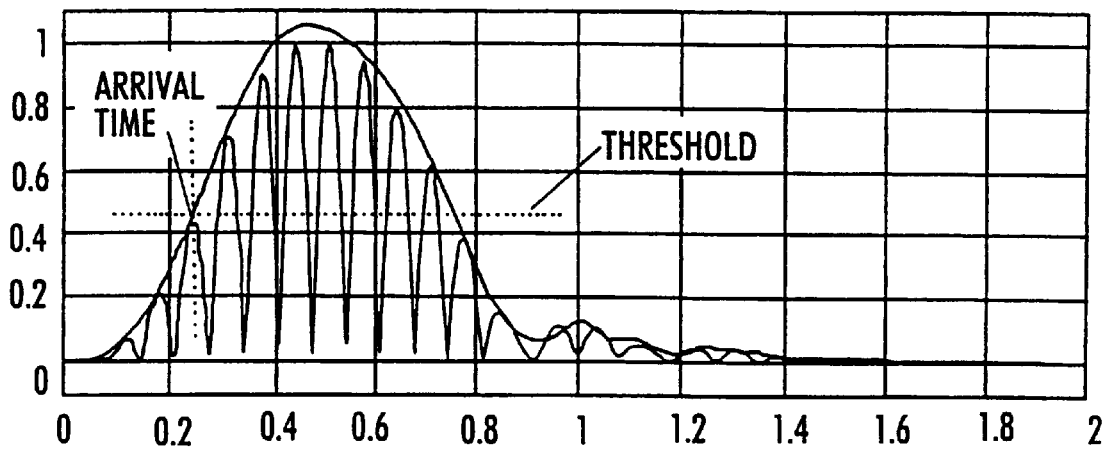
FIG. 2 is a waveform of an envelope representing the absolute value of the received pulse.
Figure 3:
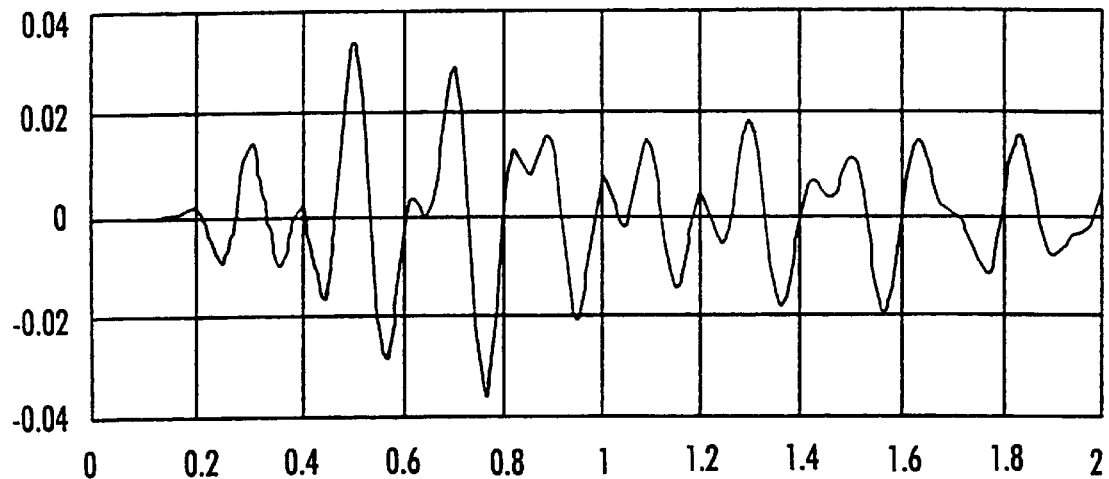
FIG. 3 illustrates a waveform of a received pulse signal in a telephone wire network.
Figure 4:
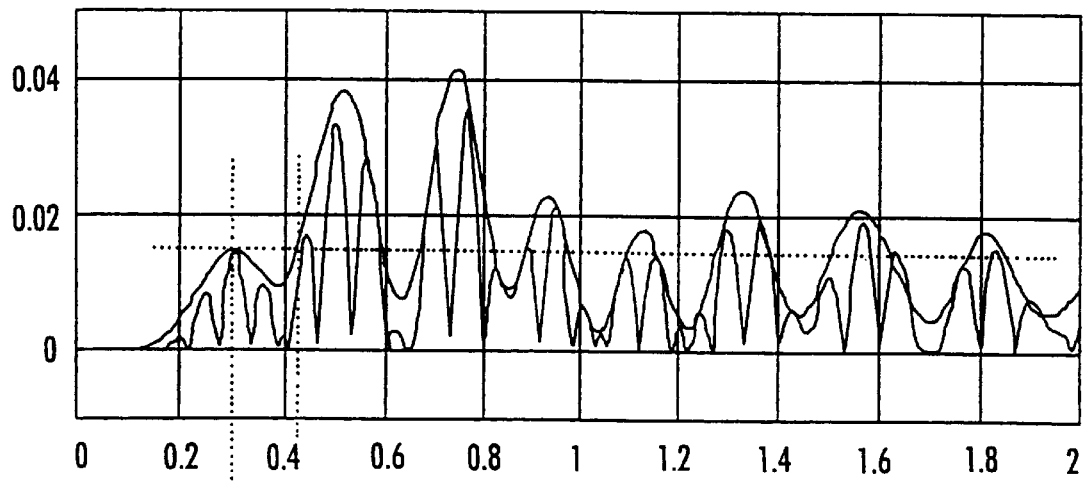
FIG. 4 illustrates a waveform of the pulse signal envelope.
Figure 5:
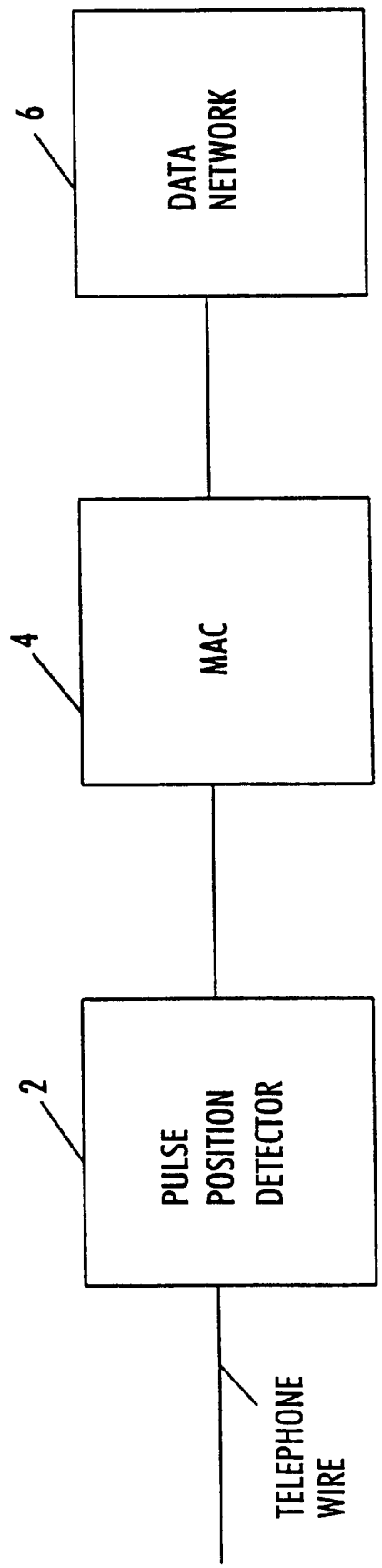
FIG. 5 illustrates a telephone wire network having a pulse position detector of the present invention.

As illustrated in FIG. 5, a pulse position detector 2 may be arranged at receiving end of a telephone wire network that transmits data over telephone line wiring that connects multiple telephone terminals such as telephone sets in a building. A transmitting station converts transmit data into pulse signals propagating over telephone line wiring in a building. The pulse position detector 2 detects the position in time of pulses received from a telephone line wire to recover the transmit data. For example, the pulse position detector 2 may identify the arrival position in time of received pulses. The arrival time position is translated into the unique bit pattern representing the transmit data. For example, the pulse position detector 2 may store a translation table having a unique bit pattern for each time slot in which a pulse may arrive. The bit pattern corresponding to the time slot, in which the received pulse has arrived, represents recovered digital data.

The bit pattern produced by the pulse position detector is supplied to a media access controller (MAC) 4, such as AM79C940 Media Access Controller for Ethernet (MACE) manufactured by Advanced Micro Devices, Inc. The MAC 4 transfers the recovered digital data to a data communications network 6, such as an Ethernet (ANSI/IEEE 802.3) network, for delivering to the addressee.

Figure 6:
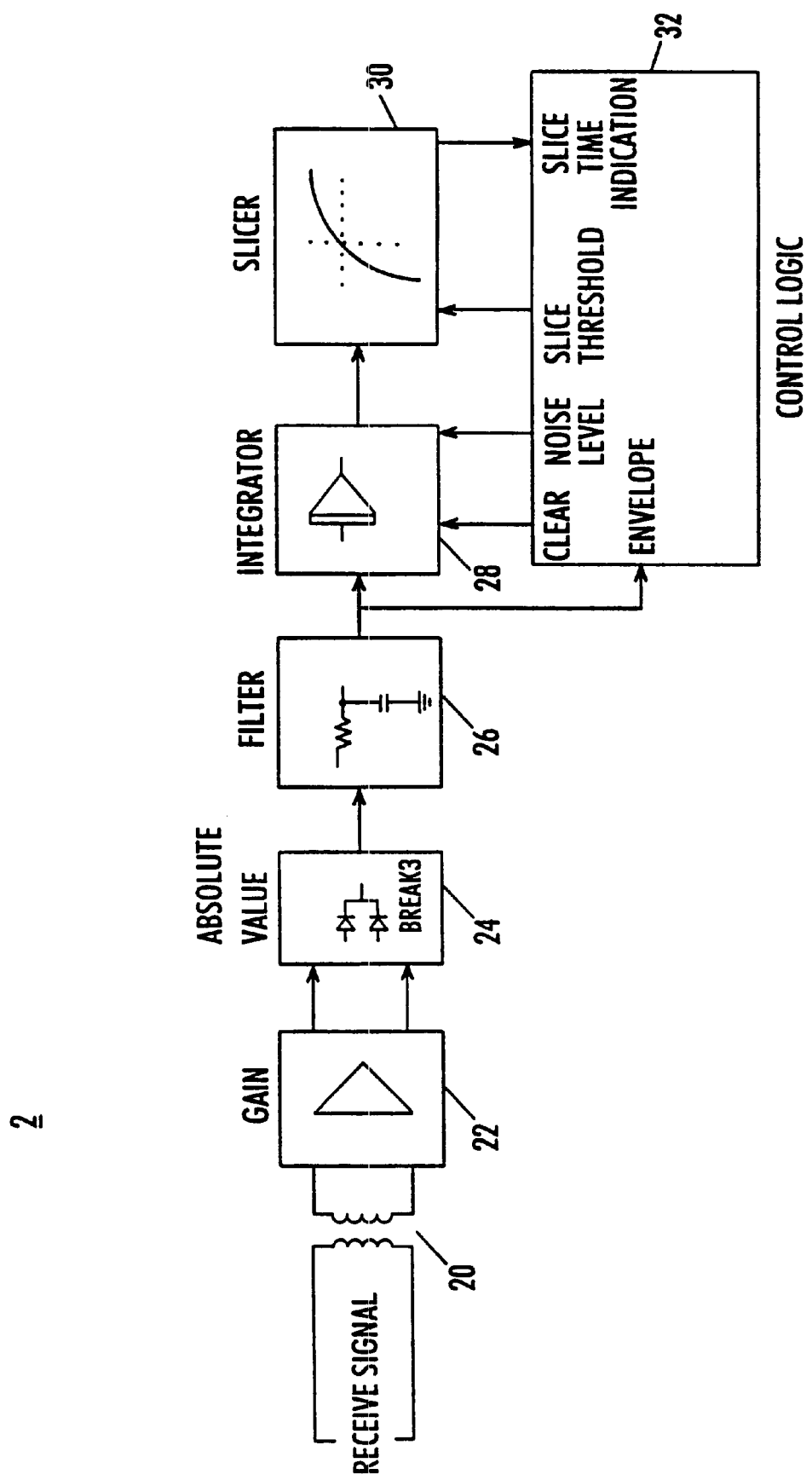
FIG. 6 is a block diagram of the pulse position detector of the present invention.
Figure 7:
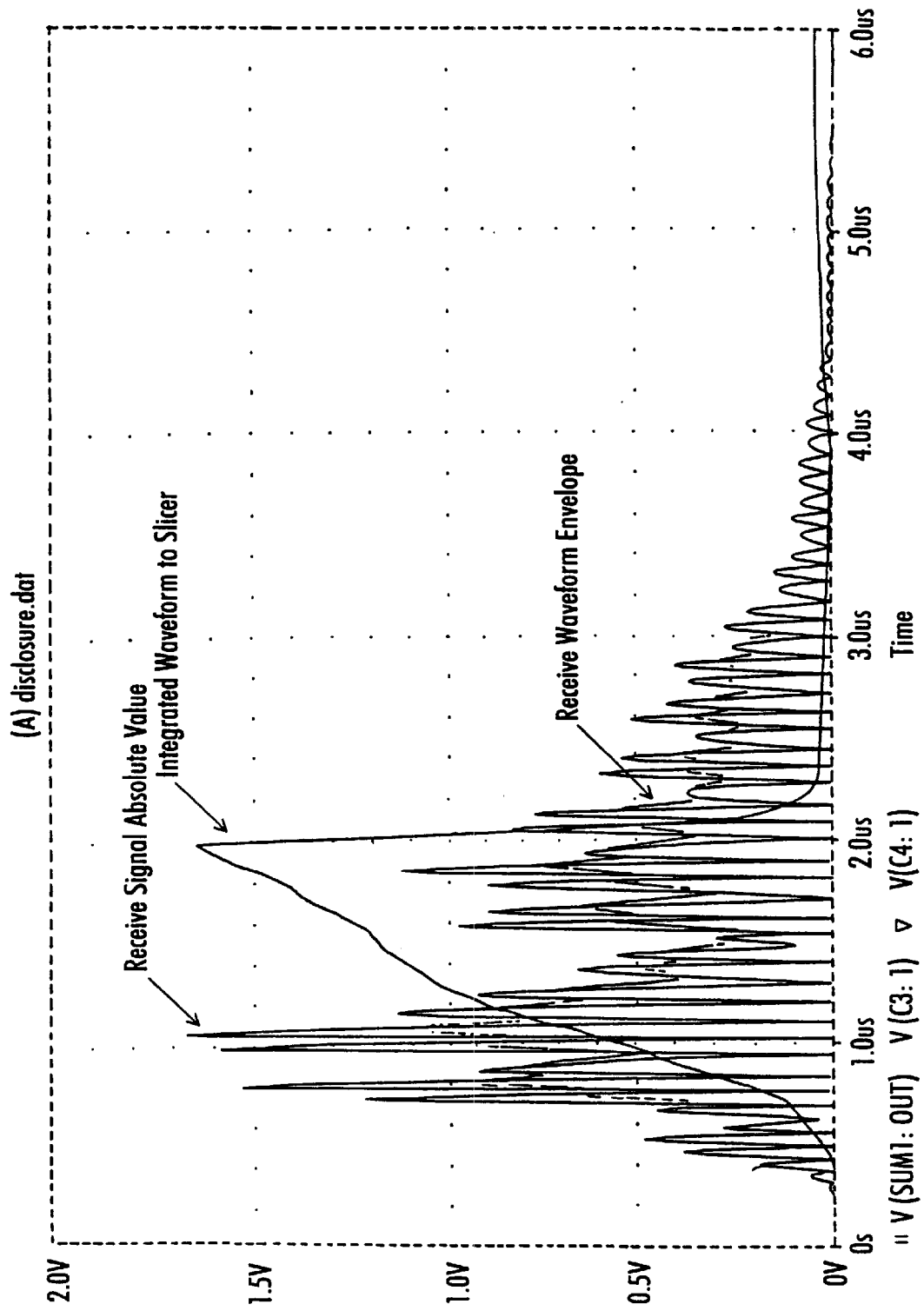
FIG. 7 illustrates waveforms of receive signal envelope and integrated signal supplied to a slicer.

Referring to FIG. 6, the pulse position detector 2 coupled to the telephone wire via a telephone coupler 20 comprises an amplifier 22 that amplifies a pulse signal received from the telephone wire to an amplitude sufficient for further processing. An absolute value envelope detector 24 coupled to the output of the amplifier 22 determines the absolute value of the received signal and produces the waveform envelope representing the absolute value of the received signal. Timing diagrams shown in FIG. 7 illustrate the receive waveform envelope produced by the detector 24. A low-pass filter 26 is coupled to the envelope detector 24 for filtering out high-frequency components of the receive waveform envelope.

The filter 26 supplies the filtered waveform envelope to an integrator 28 which performs the mathematical process of integration over time to produce an integrated signal proportional to the energy of the received pulse signal. FIG. 7 illustrates the waveform of the integrated signal at the output of the integrator 28. The integrator 28 may be implemented digitally or with an analog integrating circuit.

A slicer 30 is coupled to the output of the integrator 28 to detect when the integrated waveform crosses a preset threshold level. For example, the slicer may be implemented with an analog comparator. Alternatively, the slicer may be a digital device for detecting the moment when the integrated waveform value reaches a preset threshold value.

A control logic 32 coupled to the slicer 30 provides a slice threshold signal that defines a threshold level for slicing the integrated waveform. For example, the control logic 32 may measure levels of previously received signals to determine an optimum threshold level for a currently received pulse. The control logic 32 sets the threshold level higher than a noise level but lower than the maximum level of the waveform envelope. For example, the control logic 32 may use waveform envelops supplied from the output of the filter 26 to establish a threshold level.

When the slicer 30 detects that the integrated signal reaches the threshold level, the slicer 30 produces a slice time indication signal supplied to the control logic 32. The slice time indication signal corresponds to the arrival position in time of the received pulse signal.

In response to the slice time indication signal, the control logic 32 produces a clear signal supplied to the integrator 28 to reset it. As shown in FIG. 7, when the integrated signal reaches the threshold, the reset of the integrator 28 causes the integrated value to fall to practically zero level. As a result the integrator 28 is ready to perform the integration of the next receive waveform envelope.

In addition, the control logic 32 may produce a noise level signal supplied to the integrator 28 to set a noise level defining a minimum operating level of the integrator 28. The control logic 32 establishes the noise level based on noise detected at the output of the filter 26 in the absence of an information signal. The noise level signal prevents the integrator 28 from performing the integration until the receive waveform envelope exceeds the noise level. As a result, the accuracy of the integration is improved.

Based on the slice time indication signal produced by the slicer 30, the control logic 32 determines a digital value corresponding to data received from the telephone wire. The control logic 32 may be a programmable gate array device having registers and memory areas for handling signal and noise levels detected at the output of the filter 28, and processing the slice time indication signals produced by the slicer 30.

The slice time indication signal represents the arrival position in time of a received pulse. The control logic 30 compares the time position of the currently received pulse with time positions of previously received pulses, and determines the time slot, in which the current pulse has arrived. The control logic 30 may comprise a translation table that contains a unique bit pattern for each time slot. Based on the determined time slot, the control logic 30 finds a bit pattern corresponding to the arrival time of the received pulse. This bit pattern represents data received from the telephone wire. The determined bit pattern may be transferred to the MAC 4 that provides interface to the data network 6.

Thus, the system of the present invention produces an integrated waveform representing the energy of a pulse received from a telephone wire to detect the time position of the received pulse. As the integrated waveform always has a positive slope on the leading edge, a threshold in a slicing circuit will always correspond to a unique arrival time position, even if the received pulse is highly distorted due to multiple reflections in a telephone wire network.

There accordingly has been described a system for detecting a pulse position in a telephone wire network. A receive pulse signal is supplied from the telephone wiring to an absolute value detector that determines the absolute value by pulse signal amplitude, and produces a waveform envelope. A low-pass filter filters out high frequency components of the envelope. An integrator performs the time integration of the filtered envelope to produce an integrated waveform representing the energy of the received pulse signal. A slicing circuit determines when the integrated waveform crosses a threshold level to detect the time position corresponding to the arrival time of the received pulse signal. The arrival time position is translated into a digital value representing data received from the telephone wire.

In this disclosure, there are shown and described only the preferred embodiments of the invention, but it is to be understood that the invention is capable of changes and modifications within the scope of the inventive concept as expressed herein.

What is claimed is:

1. A pulse position detector in a telephone wire network, comprising:
   an input circuit for receiving an incoming pulse signal,
   an integrator for integrating over time a receive signal supplied from said input circuit to produce an integrated signal representing energy of the incoming pulse signal, and
   a slicing circuit for producing a pulse position signal representing a position in time of the incoming pulse signal when the integrated signal reaches a threshold level.

2. The pulse position detector of claim 1, wherein said input circuit comprises an absolute value detector for producing an envelope representing the absolute value of received pulse signal amplitude.

3. The pulse position detector of claim 2, wherein said input circuit further comprises a filter for filtering out high frequency components of said envelope.

4. The pulse position detector of claim 3, wherein said integrator performs integration of said filtered envelope supplied from said filter.

5. The pulse position detector of claim 4, wherein said slicing circuit comprises a comparator for producing a slice time indication signal when said integrated signal reaches the threshold level.

6. The pulse position detector of claim 1, further comprising a control circuit responsive to receive signals supplied from the input circuit for establishing the threshold level in said slicing circuit.

7. The pulse position detector of claim 6, wherein said control circuit is adapted to reset said integrator when said integrated signal reaches the threshold level.

8. The pulse position detector of claim 6, wherein said control circuit is coupled to said input circuit to determine a noise level.

9. The pulse position detector of claim 8, wherein said control circuit is adapted to supply said integrator with a noise level signal representing said noise level.

10. The pulse position detector of claim 9, wherein said integrator is prevented from performing integration of said receive signal until said receive signal exceeds said noise level.

11. The pulse position detector of claim 6, wherein said control circuit is responsive to said pulse position signal for producing a bit pattern identifying the position in time of said incoming pulse signal.

12. The pulse position detector of claim 11, wherein said bit pattern is transferred to a data network as data represented by said incoming pulse signal.

13. The pulse position indicator of claim 12, wherein said incoming pulse signal is supplied from Plain Old Telephone Service line wiring in a building.

14. A telephone wire network for providing data communications over telephone line wiring in a building, comprising:
   a pulse position detector responsive to an incoming pulse supplied from the telephone line wiring for detecting position in time of said pulse and producing a digital value representing said position in time, and
   a media access controller responsive to said digital value for providing an addressee with incoming data,
   said pulse position detector including:
   an input circuit coupled to the telephone line wiring,
   an integrator for performing integration in time of a receive signal supplied from said input circuit to produce an integrated signal representing energy of said incoming pulse,
   a slicing circuit for producing a time indication signal when said integrated signal reaches a preset threshold level, and
   an output circuit responsive to said time indication signal for producing said digital value transferred to said media access controller.

15. The network of claim 14, wherein said output circuit is responsive to said time indication signal to reset said integrator.

16. The network of claim 14, wherein said output circuit is adapted to set said threshold level in response to receive signals from said input circuit.

17. The network of claim 14, wherein said output circuit is coupled to said input circuit for detecting a noise level.

18. The network of claim 17, wherein said integrator is adapted to start integration of said receive signal when said receive signal exceeds said noise level.

19. The network of claim 14, wherein said input circuit comprises an absolute value detector for producing an envelope representing absolute value of incoming pulse amplitude.

20. In a telephone wire network for providing data communications over telephone line wiring in a building, a method of detecting position in time of an incoming pulse supplied from the telephone line wiring, comprising the steps of:
   producing an envelope representing the absolute value of incoming pulse amplitude,
   integrating the envelope over time to produce an integrated signal proportional to energy of the incoming pulse, and
   detecting a position in time when the integrated signal reaches a preset threshold level to indicate a position in time corresponding to arrival of the incoming pulse.

* * * * *